United States Patent [19]

Chambers

[11] Patent Number: 4,589,109
[45] Date of Patent: May 13, 1986

[54] MULTIPLEXED DIGITAL DATA TRANSMISSION

[75] Inventor: John P. Chambers, Tadworth, England

[73] Assignee: British Broadcasting Corporation, London, England

[21] Appl. No.: 599,932

[22] Filed: Apr. 13, 1984

[30] Foreign Application Priority Data

Apr. 15, 1983 [GB] United Kingdom ............... 8310315

[51] Int. Cl.⁴ .............................................. H04J 3/26
[52] U.S. Cl. .................................... 370/94; 370/100; 358/144
[58] Field of Search .................... 370/94, 100, 110.1, 370/60; 375/116, 114; 358/144

[56] References Cited

U.S. PATENT DOCUMENTS

| | | | |
|---|---|---|---|
| 4,218,756 | 8/1980 | Fraser | 370/94 |
| 4,366,479 | 12/1982 | Mori et al. | 370/94 |
| 4,398,290 | 8/1983 | Mathieu et al. | 370/94 |
| 4,410,889 | 10/1983 | Bryant | 375/114 |
| 4,414,662 | 11/1983 | Bousquet | 370/100 |

*Primary Examiner*—Douglas W. Olms
*Attorney, Agent, or Firm*—Robert F. O'Connell

[57] ABSTRACT

A digital transmission system for transmitting, e.g., television sound has two packet type indicators indicating, e.g., mono/stereo transmission. Normally the same packet type indicator is transmitted for a long sequence of packets. To provide synchronizing information to enable, e.g., appropriate timing of a sound signal to the associated video signal, the packet type indicator for a single packet is changed to an indicator which is inappropriate to the packet concerned but is appropriate to another type of packet.

5 Claims, 2 Drawing Figures

MULTIPLEXED DIGITAL DATA TRANSMISSION

BACKGROUND OF THE INVENTION

This invention relates to the transmission of digital data in multiplexed form.

It has been proposed for use in conjunction with a television transmission system, to transmit several digital signals carrying sound information by means of a multiplexed data signal which involves forming blocks of consecutive sound samples, together with additional data for error protection purposes, into "packets" of data. Each packet is preceded by a "header" which contains the address of the packet which indicates the service to which it belongs.

The proposal is for the packet to begin with a "packet-type" (PT) byte, which has three readily-distinguishable assigned states known as BC1, BC2, and BI. The packet type byte BI precedes data which (exceptionally) does not represent sound samples, but which provides information about the technical configuration and program content of the sound channel carrying that address. This also allows information about the next use of that channel to be sent in advance for storage at a decoder.

The instant at which the change to new information is made, is signalled by changing the packet type byte preceding the sound data from BC1 to BC2, or vice versa, and it retains this changed state until the next change in applicable information.

The positioning of the successive packets of a channel within the multiplex is not regular but is essentially random. The packets are inserted in such a manner that a decoder which has a specified amount of buffer storage (for example 30 ms per sound channel) can smooth out the irregularities in the delivery of the sound samples adequately to provide a regular output sample rate to the subsequent signal processing circuit such as a digital to analogue converter. Furthermore there is no control between the time of delivery of the sound samples, and that of the associated vision signal. This is particularly important as a mis-timing of more than about 10 ms can result in a noticeable loss of "lip synchronisation".

There is therefore a need to find a way by which the different sound channels within a packet multiplex accompanying a television signal may be precisely co-timed on a sample-by-sample basis with one another, and to allow all of these channels to be referred to the timing of the associated television signal.

SUMMARY OF THE INVENTION

In accordance with this invention, in such a digital multiplexer system in which at least two packet type indicators are used to distinguish different packets, a packet containing samples which are to be synchronised with one another or with an external reference is identified by applying to that packet a packet type indicator which is inappropriate to the packet concerned but is appropriate to another type of packet.

An example of the invention will now be described in more detail.

It is assumed that the multiplex is so organised that, at a frequent rate of typically between 2 and 25 times a second, certain packets from each of the channels to be associated are such that their first samples are intended to be delivered together. It should be noted that not all sound packets contain the same number of sound samples, due to the use of several coding and error protection methods, so it is necessary to specify which samples in the associated packets are intended to be coincident.

In accordance with this invention, these packets are "flagged" by replacing the BC1 or BC2 packet type byte, whichever is currently in use for that packet, by the other one of these packet type bytes on one occasion only.

This event can readily be detected at the decoder, since the two codes BC1 and BC2 are typically chosen to be separated by a Hamming distance of six, and the decoders are already equipped to recognize these codes. The multiplex is preferably organised such that all the packets to be associated with each other are transmitted in a single television frame period, of, e.g. 40 ms. This may typically contain a total of 162 packets. There is thus no ambiguity provided that the packets are not flagged more than once in each frame period.

In order to relate the sound timing to the video picture it is adequate to identify a nominal time in the video waveform at which the sound samples are intended to be released. For example it could be specified that all flagged samples within a given television frame period are to be released at the start of line 32 of the next following television frame, that is about 2 ms after the frame boundary.

The decoder has to be designed to identify the single violation of the BC1/BC2 packet type sequence used to flag the sound synchronisation packets. Thus the decoder should not respond to such an isolated change if it were a change to the next packet configuration, this being signalled by a longer term change from BC1 to BC2 or vice versa. The logic of the decoder is simplified if the instant of such a change of configuration is taken to be the start of the packet following the first changed packet type byte, so that two or more changed packet type bytes will have been received and it is therefore clear that the change was not just a violation used for synchronisation purposes.

In addition to providing operational advantages when there is a requirement to synchronise several sound signals to each other and to a vision signal, the system provides a well defined reference timing to allow more positive control of the delay through the buffer store in the decoder.

The synchronisation is particularly advantageous in that it is achieved without additional signalling, and in such a way that decoders which are not equipped to make use of the facility can be made to remain unaffected by the synchronisation information.

When used with a stereo sound service, samples from the two channels may be interleaved alternately in the same packet to ensure that they can be delivered together to provide the necessary synchronism between the two channels. In this instance the present invention is not necessary for preserving the relative timing for the pair of stereo channels, through it is still necessary to maintain lip synchronisation with the television signal. Furthermore, it is useful to provide synchronism between several different sound channels, for example where there are commentaries in several different languages, or to provide "surround-sound".

In practice the packet header may also carry a continuity index, such as a 2-bit count which increments modulo-4 which enables loss of packets with the wanted address to be detected by recognising an irregularity in the count sequence.

BRIEF DESCRIPTION OF THE DRAWINGS

A more detailed example of the invention will now be given with reference to the drawings, in which.

DETAILED DESCRIPTION OF THE PREFERRED EMBODIMENTS

The invention can be embodied in a television broadcasting system in which the sound channel is transmitted in digital form, possibly in conjunction with a data channel. In one example the sound channel is digitally coded into packets of length 751 bits. The first 23 bits indicate the address to which the packet belongs, and which may, for example, correspond to a monophonic or stereophonic sound service. The next 8 bits then indicate one of the 'packet types' within the channel and the remaining 720 bits contain either coded sound or service information, depending on the packet type. Two alternative packet type bytes (BC1 and BC2) are used for coded sound, to allow a change in sound configuration (e.g. mono/stereo) to be signalled in synchronism with a change from samples taken from one packet to samples from the next packet. These changes are to be infrequent (perhaps only a few times per day) so for many minutes or hours the packets containing coded sound for a particular service will use either the BC1 packet type byte throughout or the BC2 packet type byte throughout. Another packet type byte (BI) is used to identify a packet belonging to the same service channel address but containing data about the sound configuration, either that configuration currently in use (this information is needed frequently to assist decoders which have just started to receive the service) or about the configuration next to be used.

Figure 1:
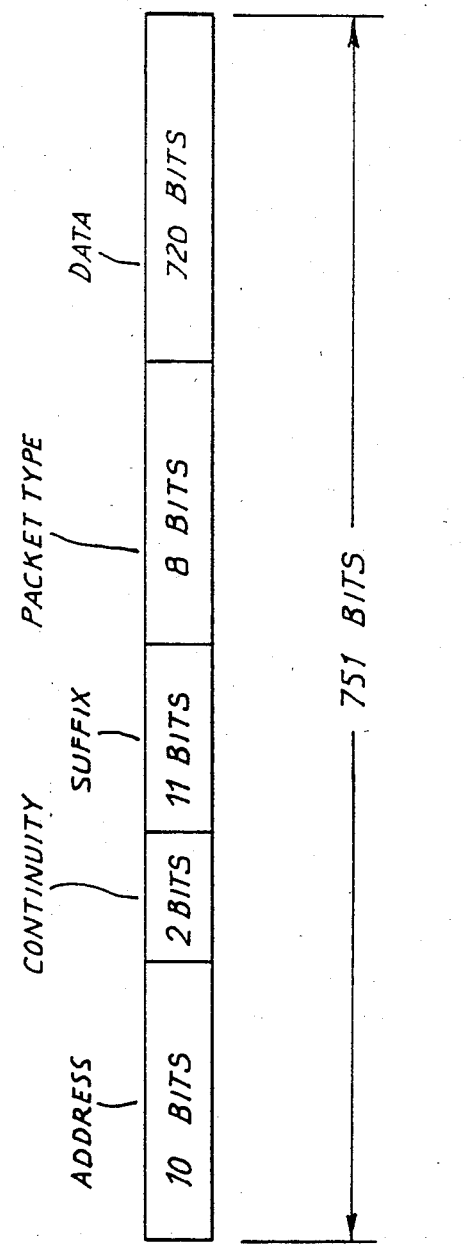
FIG. 1 illustrates the form of an individual packet.

The format of such a data channel with its address header is illustrated in FIG. 1.

At a receiver, the decoder logic can be prepared for the 'next' configuration which starts following a change signalled by the use of the alternative packet type byte. In order to give protection against occasional wrongly-received changes, and to allow the decoder some advance warning of the configuration change, the packet type byte may be changed three sound packets in advance of the change to the next configuration within a coded sound packet.

It will be appreciated that this essentially asynchronous packet multiplex system has no provision for keeping two or more sound signals in step, sample by sample, with each other and, when necessary, with the accompanying television picture. This synchronisation is necessary to avoid unwanted beating, and frequency combing and echo effects when the sounds come from a common source, and to maintain 'lip-synchronisation' with a television picture.

In accordance with this invention the information for such synchronisation is provided by including controlled violations of the BC1/BC2 packet type byte sequence, to serve as 'syncs in sound'. This can be done without needing any additional signalling capacity and without disturbing the normal function of the BC1/BC2 sequence (providing that this violation is understood by the decoder). This synchronising 'flag' is then used in the decoder to control the packet buffer storage reading rate so that services containing such flags are let out of the storage with their flags co-timed, and at a time corresponding to a fixed point in the accompanying television signal (e.g. the start of line number 32 in the frame).

Figure 2:
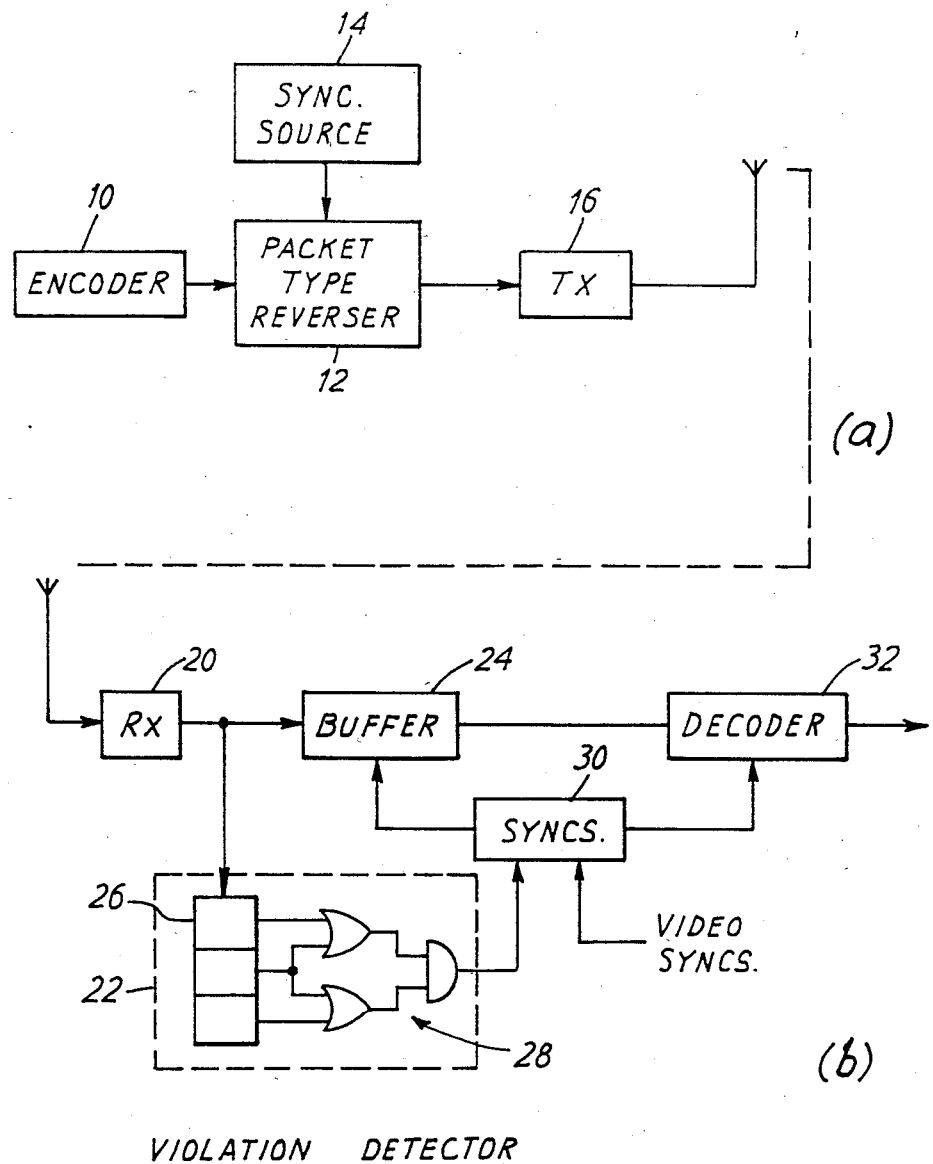
FIG. 2 is a block circuit diagram of part of a transmission system embodying the invention.

FIG. 2 illustrates one possible form of a transmitter and receiver at (a) and (b) respectively. At the transmitter the sound signal is digitally encoded in an encoder 10 and applied in the form of packets of FIG. 1 type to a packet type reverser circuit 12. This is controlled by a synchronising source 14 and at the desired synchronisation instants reverses the packet type of the current packet so that if the encoder 10 is producing a series of packets of type BC1, at the synchronisation instant one packet is changed so that its header indicates that it is type BC2. The resultant modified signal is applied to a transmitter 16 where it is combined with the video signal and modulated for transmission.

At the receiver, the signal is demodulated and the digital sound/data signal separated in a receiver 20. This signal is applied to a violation detector 22 and to a buffer store 24. The violation detector looks at the packet types of successive packets and stores three successive packet types, as illustrated diagrammatically by a shift register 26. A combination of gates 28 provides an output if the middle register stage differs from both the first and third register stage, and this output is correlated with video synchronising information in a circuit 30 and is applied to the buffer 24 to control the timing of the read operation for the buffer. In addition the output of the violation detector 22 is applied to a decoder 32 to instruct the decoder to ignore the packet type which was transmitted for synchronisation purposes but instead to treat it as the same packet type as the preceding packet.

The use of these synchronising flags is optional in that a decoder can ignore them and be no worse off than if they did not exist, but it is clearly preferable for decoders to be equipped to respond to the synchronising flags. There is no ambiguity in the meaning of the flags because they are sent at a rate of 25 Hz (once per frame) or slower, the television reference point occurs at the 25 Hz rate and the peak-to-peak timing excursion of the packet buffer is likely to be less than 12 ms.

In the normal steady state condition the occasional loss of one of the synchronising pulses wil not cause any problems with the receiver operation.

The systems described thus have the advantage that they are usable by a decoder which is not able to use the synchronising information as they only employ existing packet type codes and do not introduce new codes for synchronising purposes. Furthermore, the Hamming distances between the codes used remain at the existing values and are not reduced by the transmission of the additional synchronising information.

What is claimed is:

1. A digital multiplexer system which includes means for providing data packets containing samples which are to be synchronised with one another or with an external reference, said data packets further containing packet type indicators for distinguishing different packet types, and means for recognising the packet type indicator of a particular data packet which is inappropriate to said data packet but which is appropriate to another type of data packet so as to identify said particular data packet.

2. A digital multiplexer system according to claim 1, wherein the data packet providing means is adapted to signal a change in packet type from a firt packet type to a second packet type by applying the second packet type to at least one packet of the first packet type prior to the change.

3. A system according to claim 1, in which each data packet of a plurality of successive data packets carries a continuity index which increments with successive data packets whereby loss of a data packet can be recognised by an irregularity in the sequencing of said increments.

4. A digital multiplex transmitter comprising means for generating successive data packets, means for applying to the packets appropriate packet type indicators to distinguish different packet types, and means for applying to a selected packet a packet type indicator which is inappropriate to the packet concerned but is appropriate to another type of packet to indicate that the said packet contains samples which are to be synchronised.

5. A digital multiplex receiver comprising means for receiving an input signal comprising a series of data packets each having a packet type indicator, means responsive to the packet type indicators for providing properly synchronised data packets for use by said receiver, and means for detecting a single occurrence of a packet type indicator which differs from the preceding and succeeding packet type indicators to provide a synchronising output and to inhibit said responsive means from responding to said single different packet type indicator occurrence.

* * * * *